(12) United States Patent
Fujisaki et al.

(10) Patent No.: US 10,452,530 B2
(45) Date of Patent: Oct. 22, 2019

(54) INFORMATION PROCESSING APPARATUS AND INFORMATION PROCESSING METHOD

(71) Applicant: MITSUBISHI ELECTRIC CORPORATION, Tokyo (JP)

(72) Inventors: Tetsuji Fujisaki, Tokyo (JP); Yukio Kodama, Tokyo (JP); Takehisa Mizuguchi, Tokyo (JP); Masahiro Deguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/071,550

(22) PCT Filed: Feb. 26, 2016

(86) PCT No.: PCT/JP2016/055829
§ 371 (c)(1),
(2) Date: Jul. 20, 2018

(87) PCT Pub. No.: WO2017/145361
PCT Pub. Date: Aug. 31, 2017

(65) Prior Publication Data
US 2019/0004939 A1    Jan. 3, 2019

(51) Int. Cl.
*G06F 12/00* (2006.01)
*G06F 12/02* (2006.01)
(Continued)

(52) U.S. Cl.
CPC ............ *G06F 12/0238* (2013.01); *G06F 7/08* (2013.01); *G06F 12/00* (2013.01); *G06F 12/02* (2013.01);
(Continued)

(58) Field of Classification Search
CPC ........ G06F 12/0238; G06F 7/08; G06F 12/00; G06F 12/06; G06F 12/02; G06F 12/16; G06F 2212/251
See application file for complete search history.

(56) References Cited

U.S. PATENT DOCUMENTS

2007/0143535 A1   6/2007 Kitamura et al.
2008/0140918 A1\*  6/2008 Sutardja ............... G06F 12/0246
                                                                    711/103
(Continued)

FOREIGN PATENT DOCUMENTS

JP       7-160597 A    6/1995
JP    2007-164606 A    6/2007
(Continued)

OTHER PUBLICATIONS

International Search Report, issued in PCT/JP2016/055829, PCT/ISA/210, dated Mar. 29, 2016.

*Primary Examiner* — Francisco A Grullon
(74) *Attorney, Agent, or Firm* — Birch, Stewart, Kolasch & Birch, LLP

(57) ABSTRACT

It is an object to provide a technique that can enhance data rewriting tolerance. An information processing apparatus includes a first nonvolatile memory and a second nonvolatile memory. The first nonvolatile memory stores first data. The second nonvolatile memory stores second data that is higher in update frequency than the first data. This allows the data rewriting tolerance in the device to be enhanced. For example, data of a dynamic map that is a dynamically changeable map can be applied to at least the second data among the first data and the second data.

11 Claims, 8 Drawing Sheets

(51) Int. Cl.
*G06F 12/06* (2006.01)
*G06F 12/16* (2006.01)
*G06F 7/08* (2006.01)
*G06F 3/06* (2006.01)

(52) U.S. Cl.
CPC .............. *G06F 12/06* (2013.01); *G06F 12/16* (2013.01); *G06F 3/0679* (2013.01); *G06F 12/0246* (2013.01); *G06F 2212/251* (2013.01)

(56) References Cited

U.S. PATENT DOCUMENTS

| | | | |
|---|---|---|---|
| 2012/0066439 A1* | 3/2012 | Fillingim | G06F 11/3485 711/103 |
| 2017/0235486 A1* | 8/2017 | Martineau | G06F 3/0616 711/103 |
| 2017/0285948 A1* | 10/2017 | Thomas | G06F 3/064 |

FOREIGN PATENT DOCUMENTS

| | | |
|---|---|---|
| JP | 2010-512569 A | 4/2010 |
| JP | 2010-198407 A | 9/2010 |
| JP | 2011-186558 A | 9/2011 |
| WO | WO 2008/073421 A2 | 6/2008 |
| WO | WO 2017/145360 A1 | 8/2017 |

\* cited by examiner

F I G . 5
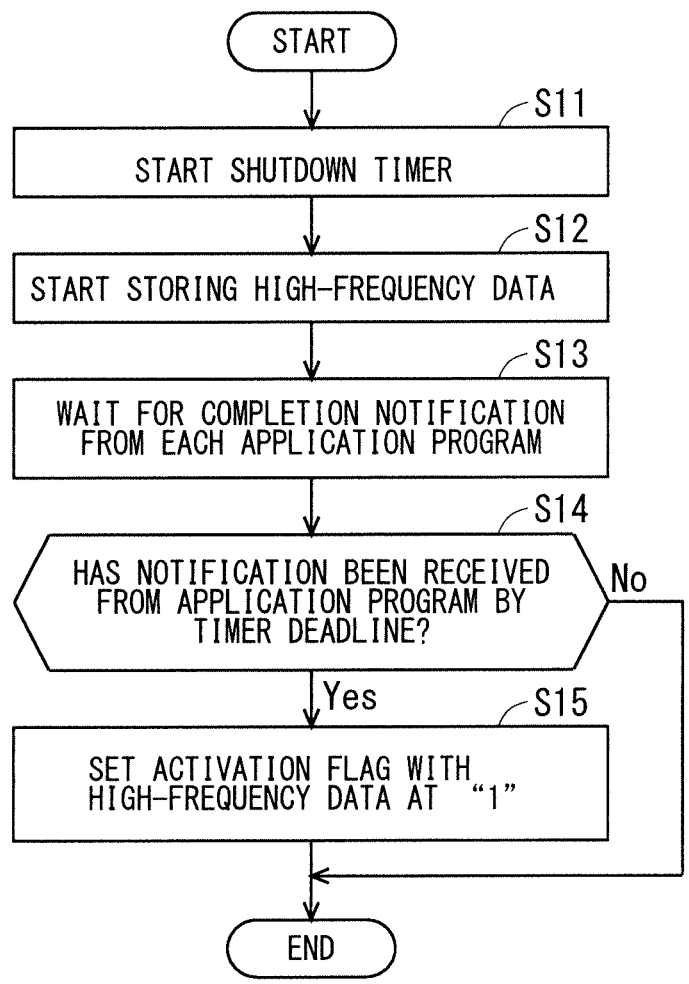

| APPLICATION PROGRAM | HIGH-FREQUENCY DATA FLAG |
|---|---|
| NAVIGATION PROGRAM | 1 |
| AUDIO REPRODUCTION PROGRAM | 0 |

| MANAGEMENT UNIT | ACTIVATION FLAG WITH HIGH-FREQUENCY DATA |
|---|---|
| ACTIVATION WITH HIGH-FREQUENCY DATA | 1 |

F I G . 1 0
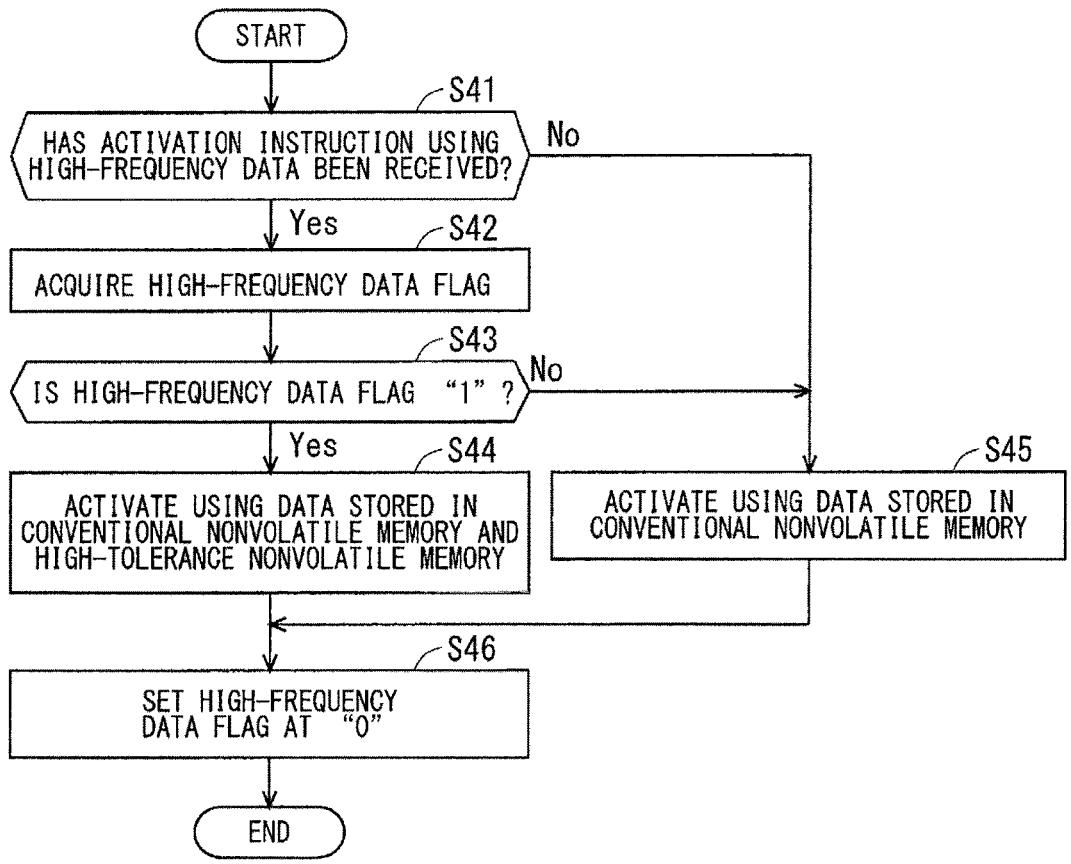

F I G . 1 1
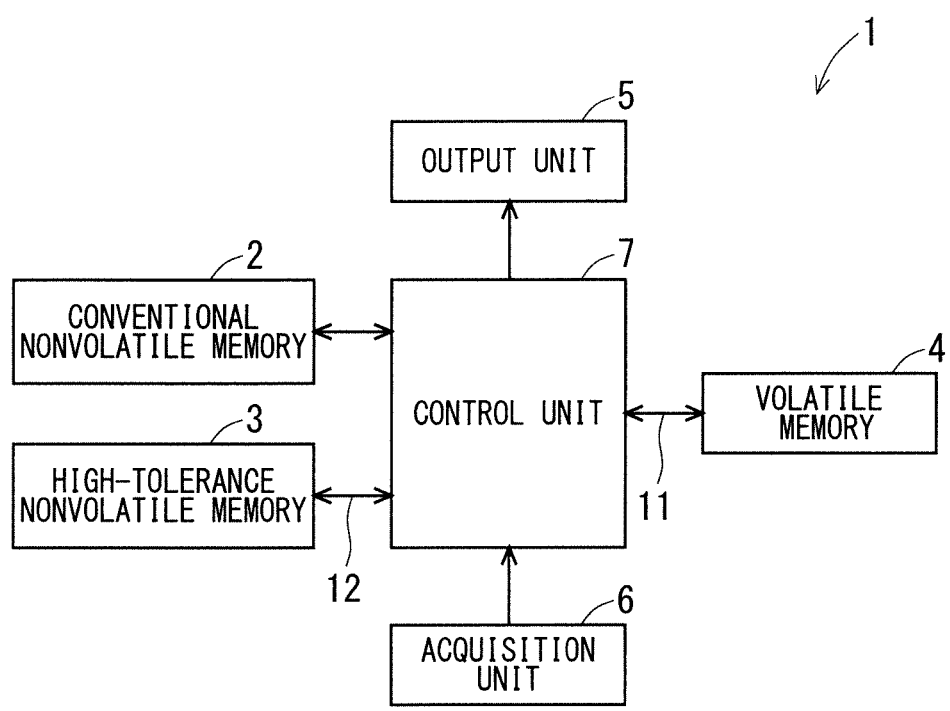

INFORMATION PROCESSING APPARATUS AND INFORMATION PROCESSING METHOD

TECHNICAL FIELD

The present invention relates to an information processing apparatus and an information processing method.

BACKGROUND ART

As a technique for activating a stopped device at high speed, various techniques have been proposed (for example, Patent Document 1). In addition, in recent years, nonvolatile memories higher in various types of performance than nonvolatile memories widely used conventionally (hereinafter referred to as "conventional nonvolatile memories") have been developed.

PRIOR ART DOCUMENTS

Patent Documents

Patent Document 1: Japanese Patent Application Laid-Open No. 2011-186558

SUMMARY

Problem to be Solved by the Invention

In addition, in recent years, the update frequency of data stored in the nonvolatile memory has become higher. However, the number of rewrites of the conventional nonvolatile memory is relatively small. Therefore, with a configuration that stores data with a high update frequency in the conventional nonvolatile memory, since the allowable number of rewrites will be surpassed soon, there is a problem that it becomes impossible to rewrite data.

Therefore, the present invention has been made in view of the above-described problem, and it is an object of the present invention to provide a technique that can enhance data rewriting tolerance in a device.

Means to Solve the Problem

An information processing apparatus according to the present invention includes: a first nonvolatile memory to store first data; and a second nonvolatile memory configured to store second data that is higher than the first data in update frequency, the second nonvolatile memory being given the larger number of rewrites than the first nonvolatile memory.

Effects of the Invention

According to the present invention, the first data is stored in the first nonvolatile memory, and the second data that is higher than the first data in update frequency is stored in the second nonvolatile memory being given the larger number of rewrites than the first nonvolatile memory. With such a configuration, data rewriting tolerance in a device can be enhanced.

The objects, features, aspects, and advantages of the present invention will be more apparent from the following detailed description and the accompanying drawings.

BRIEF DESCRIPTION OF DRAWINGS

FIG. 5 is a flowchart illustrating an operation of the infotainment device according to the third embodiment.

FIG. 10 is a flowchart illustrating the operation of the infotainment device according to the third embodiment.

FIG. 11 is a block diagram illustrating a configuration of an infotainment device according to a fourth embodiment.

DESCRIPTION OF EMBODIMENTS

First Embodiment

Hereinafter, a configuration in which an information processing apparatus according to a first embodiment of the present invention is applied to an infotainment device mounted in a vehicle (or an infotainment system) will be described as an example. Hereinafter, a vehicle in which the infotainment device is mounted and which is a target of attention will be described as a "subject vehicle." Note that the infotainment device is a device that controls output of infotainment (for example, guidance to a destination, a map around a position of the vehicle, multimedia such as music or moving image, and the like).

Figure 1:
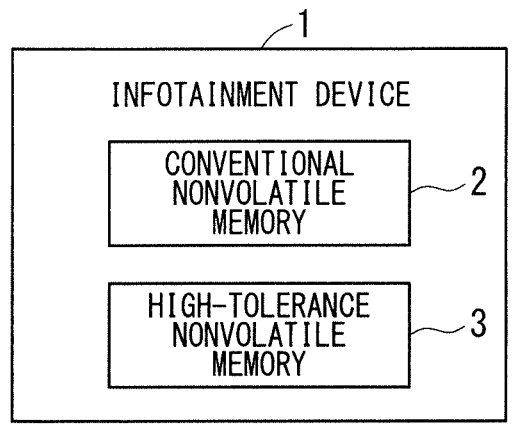
FIG. 1 is a block diagram illustrating a configuration of an infotainment device according to a first embodiment.

FIG. 1 is a block diagram illustrating a configuration of the infotainment device according to the present first embodiment. The infotainment device 1 of FIG. 1 includes a conventional nonvolatile memory 2, which is a first nonvolatile memory, and a high-tolerance nonvolatile memory 3, which is a second nonvolatile memory. Note that hereinafter, the conventional nonvolatile memory is also referred to as a "low-tolerance nonvolatile memory" by comparison with the high-tolerance nonvolatile memory 3.

The conventional nonvolatile memory 2, which is a low-tolerance nonvolatile memory, stores first data. To the conventional nonvolatile memory 2, which is a low-tolerance nonvolatile memory, for example, an HDD (Hard Disk Drive), eMMC (Embedded Multi Media Card), eSD (Embedded SD), and the like are applied.

The high-tolerance nonvolatile memory 3 is a memory being given the larger number of rewrites than the conventional nonvolatile memory 2, which is a low-tolerance nonvolatile memory, and stores second data that is higher than the first data in update frequency. To the high-tolerance nonvolatile memory 3, for example, a memory having features such as the larger number of rewrites than a conventional NAND flash memory (for example, a 3D NAND flash memory or the like) is applied. Note that in the following description, it is assumed that the first data is "low-frequency data" and the second data is "high-frequency data."

According to the present first embodiment as described above, the low-frequency data is stored in the conventional nonvolatile memory 2, which is a low-tolerance nonvolatile memory, and the high-frequency data is stored in the high-tolerance nonvolatile memory 3. With this, as the whole infotainment device 1, data rewriting tolerance can be made higher than before, and the occurrence of a conventional fault (for example, data error, memory exchange, and the like) can be suppressed. Note that although the high-tolerance nonvolatile memory 3 is more expensive than the conventional nonvolatile memory 2, in the present first embodiment, since low-frequency data is stored in the conventional nonvolatile memory 2 and high-frequency data is stored in the high-tolerance nonvolatile memory 3, the capacity of the high-tolerance nonvolatile memory 3 can be reduced as compared with a case where all the data is stored in the high-tolerance nonvolatile memory 3. Therefore, high costs can be suppressed.

In that connection, in recent years, there has been known a technique (suspend/resume) to save (suspend) data by continuously supplying power to a volatile memory and to perform activation (resuming) quickly by utilizing this data at a time of the activation (return). Since this technique requires a backup power supply leading to an increase in a dark current, when an infotainment device-mounted vehicle is left unattended for a long period of time, there is a possibility that the remaining amount of power in a battery of the vehicle becomes lower than the power necessary for activating the vehicle and that the vehicle cannot be activated. In contrast, according to the present first embodiment, since the backup power supply becomes unnecessary because of the high-tolerance nonvolatile memory 3, it is also expected to reduce the possibility that the subject vehicle cannot be activated.

Second Embodiment

Figure 2:
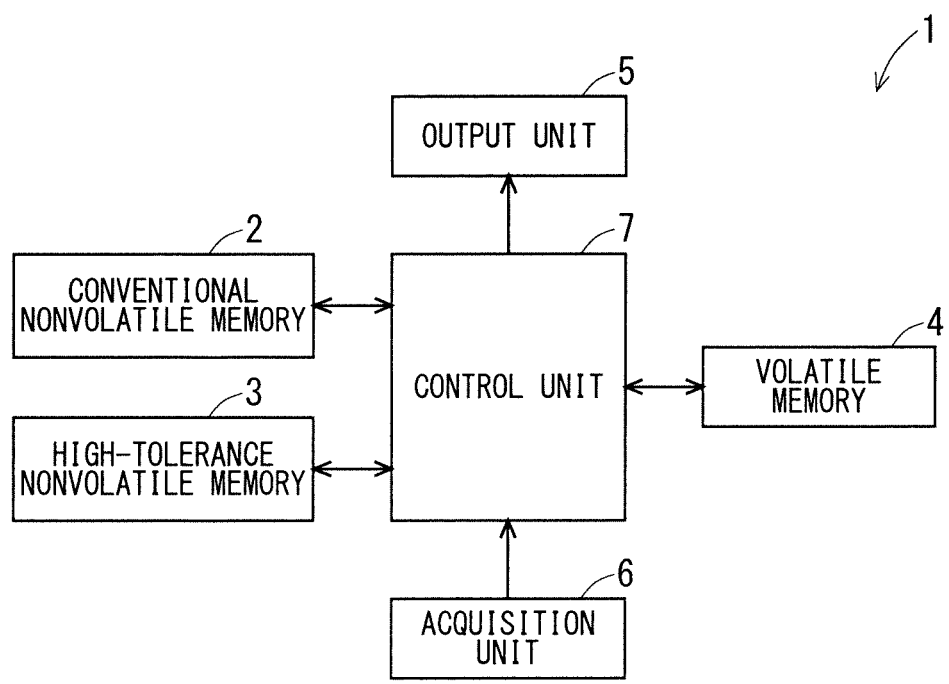
FIG. 2 is a block diagram illustrating a configuration of an infotainment device according to a second embodiment.

FIG. 2 is a block diagram illustrating a configuration of an infotainment device according to a second embodiment of the present invention. Hereinafter, of constituent elements to be described in the present second embodiment, constituent elements which are the same as or similar to constituent elements of the first embodiment are denoted with the same reference signs, and different constituent elements will mainly be described.

Also in the present second embodiment, a conventional nonvolatile memory 2, which is a low-tolerance nonvolatile memory, stores low-frequency data as in the first embodiment, and a high-tolerance nonvolatile memory 3 stores high-frequency data as in the first embodiment.

Note that in the present second embodiment, it is assumed that the low-frequency data and the high-frequency data are data on a dynamic map that is a dynamically changeable map used for automatic driving or the like. Specifically, it is assumed that the low-frequency data is static data (for example, data on existing roads and landmarks, traffic rule data such as road signs, and other data) out of the data on the dynamic map. Also, it is assumed that the high-frequency data is dynamic data (for example, data on conditions of mobile units such as an subject vehicle, non-subject vehicles, and pedestrians, data on road conditions such as road surfaces, data on traffic signal conditions such as lighting of traffic signals, and other data) out of the data on the dynamic map. However, this is merely one example, and for example, static data based on big data analysis results other than the dynamic map may be applied to the low-frequency data, and the data on the dynamic map, dynamic big data, and other data may be applied to the high-frequency data.

In addition to the constituent elements of the first embodiment, the infotainment device 1 of FIG. 2 includes a volatile memory 4, an output unit 5, an acquisition unit 6, and a control unit 7 that comprehensively controls the constituent elements of the infotainment device 1.

The volatile memory 4 stores data used for the infotainment device 1. To the volatile memory 4, for example, an SDRAM (Synchronous Dynamic Random Access Memory) or the like is applied.

Under the control of the control unit 7, the output unit 5 outputs infotainment such as guidance to a destination. To the output unit 5, for example, a display device, an audio output device, or the like is applied. Note that in the configuration of FIG. 2, the output unit 5 is included in the infotainment device 1, but this is merely one example, and the output unit 5 may be separate from the infotainment device 1.

The acquisition unit 6 acquires data. In the present second embodiment, the acquisition unit 6 acquires the data on the dynamic map. To this acquisition unit 6, for example, a sensor (including a camera and the like) is applied that can detect, as the data on the dynamic map, data such as a position of the subject vehicle, positions of non-subject vehicles around the subject vehicle, positions of pedestrians around the subject vehicle, and a shape of a route on which the subject vehicle is traveling. Alternatively, to the acquisition unit 6, a communication device is applied that can receive road conditions, traffic signal conditions, and other conditions by wired communication or wireless communication as the data on the dynamic map. Alternatively, to the acquisition unit 6, both the above-described sensor and the above-described communication device are applied.

The control unit 7 sorts the data acquired by the acquisition unit 6 into the low-frequency data or the high-frequency data based on a type of the data. In the present second embodiment, when the type of data acquired by the acquisition unit 6 is "static", the control unit 7 sorts the acquired data into the low-frequency data and stores the sorted data in the conventional nonvolatile memory 2. Meanwhile, when the type of data acquired by the acquisition unit 6 is "dynamic", the control unit 7 sorts the acquired data into the high-frequency data and stores the sorted data in the high-tolerance nonvolatile memory 3. In the present second embodiment, it is assumed that the type of data is acquired by the acquisition unit 6, but this is not restrictive. It is assumed that the data type to be sorted into the high-frequency data and the data type to be sorted into the low-frequency data have been predetermined.

Note that as the control unit 7, a processing circuit is used such as, for example, a CPU (central processing unit, also referred to as a central processor, processing device, arithmetic device, microprocessor, microcomputer, processor, and DSP) that executes a program, or a SoC (System-on-a-chip) including a CPU.

Figure 3:
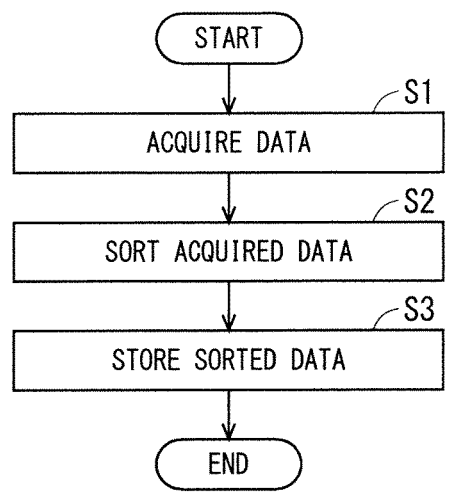
FIG. 3 is a flowchart illustrating an operation of the infotainment device according to the second embodiment.

FIG. 3 is a flowchart illustrating an operation of the infotainment device 1 according to the present second embodiment at the time of update.

First, in step S1, the acquisition unit 6 acquires data.

In step S2, the control unit 7 sorts the data acquired by the acquisition unit 6 into the low-frequency data or the high-frequency data based on the type of the data.

In step S3, the control unit 7 stores the data sorted into the low-frequency data in the conventional nonvolatile memory 2, and stores the data sorted into the high-frequency data in the high-tolerance nonvolatile memory 3. Thereafter, the operation of FIG. 3 ends.

According to the present second embodiment as described above, the data acquired by the acquisition unit 6 is sorted into the low-frequency data or the high-frequency data based on the type of the data. When the update frequency differs depending on the type of data, by the control unit 7 sorting the data into the low-frequency data or the high-frequency data based on the type of data, the update frequency for each data is accurately determined, making it possible to sort data appropriately. This enables the storage described in the first embodiment, and can implement storage that can enhance the data rewriting tolerance as the whole infotainment device 1.

In particular, as the whole infotainment device 1, enhancing the data rewriting tolerance is effective in a configuration using a dynamic map with a relatively high frequency of rewriting.

Modifications of Second Embodiment

In the second embodiment, the control unit 7 sorts the data acquired by the acquisition unit 6 into the low-frequency data or the high-frequency data based on whether the type of the data is static or dynamic. However, this is not restrictive, and the following modifications 1 to 3 may be applied.

Modification 1

When the type of data acquired by the acquisition unit 6 is, for example, "existing road", "landmark", "traffic rule", or the like, the control unit 7 may sort the data into the low-frequency data. Also, when the type of data acquired by the acquisition unit 6 is, for example, "conditions of mobile units", "road conditions", "traffic signal conditions", or the like, the control unit 7 may sort the data into the high-frequency data.

Even such a modification 1 can obtain the same effect as in the second embodiment.

Modification 2

The control unit 7 may sort the data acquired by the acquisition unit 6 into the low-frequency data or the high-frequency data based on an expiration date of the data. For example, when the expiration date of the data (time period from the current date and time to the expiration date and time of the data) is larger than a predetermined threshold, the control unit 7 may sort the data into the low-frequency data, and otherwise, the control unit 7 may sort the data into the high-frequency data. Since it is expected that the data will be updated before the expiration date passing, by the control unit 7 sorting the data into the low-frequency data or the high-frequency data based on the expiration date of the data, the update frequency for each data is accurately determined, making it possible to sort the data appropriately. Note that here, it is assumed that the expiration date of the data is acquired by the acquisition unit 6, but this is not restrictive.

Even such a modification 2 can obtain the same effect as in the second embodiment.

Modification 3

The acquisition unit 6 may acquire data at a plurality of points of time. In this case, the control unit 7 may learn or predict the update frequency of the data based on the data at the plurality of points of time acquired by the acquisition unit 6, and the control unit 7 may sort the data into the low-frequency data or the high-frequency data based on the update frequency.

For example, the control unit 7 may learn or predict the update frequency per unit time period based on an update history of the same data or data of the same type (data at the plurality of points of time). Then, when the update frequency is smaller than a predetermined threshold, the control unit 7 may sort the data into the low-frequency data, and when the update frequency is larger than the predetermined threshold, the control unit 7 may sort the data into the high-frequency data. That is, the control unit 7 may sort the data acquired by the acquisition unit 6 into the low-frequency data or the high-frequency data based on an update date and time of the data. Also, the control unit 7 may learn or predict an update cycle (time period) based on the update history (data at the plurality of points of time) of the same data or data of the same type. When the update cycle is larger than a predetermined threshold, the data may be sorted into the low-frequency data, and when the update cycle is smaller than the predetermined threshold, the data may be sorted into the high-frequency data. By the control unit 7 sorting the data into the low-frequency data or the high-frequency data based on the update history of the data, it becomes possible to sort the data accurately based on the actual update frequency for each data.

Also, for example, as another example of modification 3, the acquisition unit 6 may acquire data (traffic rules, landmarks, traffic regulations, road conditions, progress conditions, and the like) at a plurality of points of time based on at least one piece of information on the subject vehicle including a position, a moving direction, and a moving speed of the subject vehicle, and a route on which the subject vehicle is traveling. Then, the control unit 7 may sort the data into the low-frequency data and the high-frequency data based on the type of data to acquire. Also, the control unit 7 may sort the data into the low-frequency data and the high-frequency data based on at least one piece of information on the subject vehicle. For example, for acquiring data (for example, road conditions) based on the route of the subject vehicle, when the speed of the subject vehicle is equal to or higher than a predetermined speed, the control unit 7 may sort the data into the high-frequency data, and when the speed of the subject vehicle is less than the predetermined speed, the control unit 7 may sort the data into the low-frequency data. Also, for example, for acquiring data (for example, traffic signal conditions) based on the route of the subject vehicle, when the route is in an urban area or a general road, the data may be sorted into the high-frequency data, and when the route is in a mountainous region or on an expressway, the data may be sorted into the low-frequency data. Also, the control unit 7 may predict the update frequency or the update cycle of each data based on at least one piece of information on the subject vehicle, and the control unit 7 may sort the data into the low-frequency data and the high-frequency data based on the predicted update frequency or update cycle of each data. For example, based on the information on the speed of the subject vehicle and the traffic signal positions on the route, the update frequency or update cycle of the traffic signal conditions may be predicted, and the data may be sorted into the low-frequency data and the high-frequency data based on the predicted update frequency or update cycle of each data. As described above, by the control unit 7 sorting the data into the low-frequency data and the high-frequency data based on at least one piece of information on the subject vehicle, it becomes possible to accurately sort the data according to the actual condition of the subject vehicle indicated in the information on the subject vehicle.

Even such a modification 3 can obtain the same effect as in the second embodiment.

Third Embodiment

Figure 4:
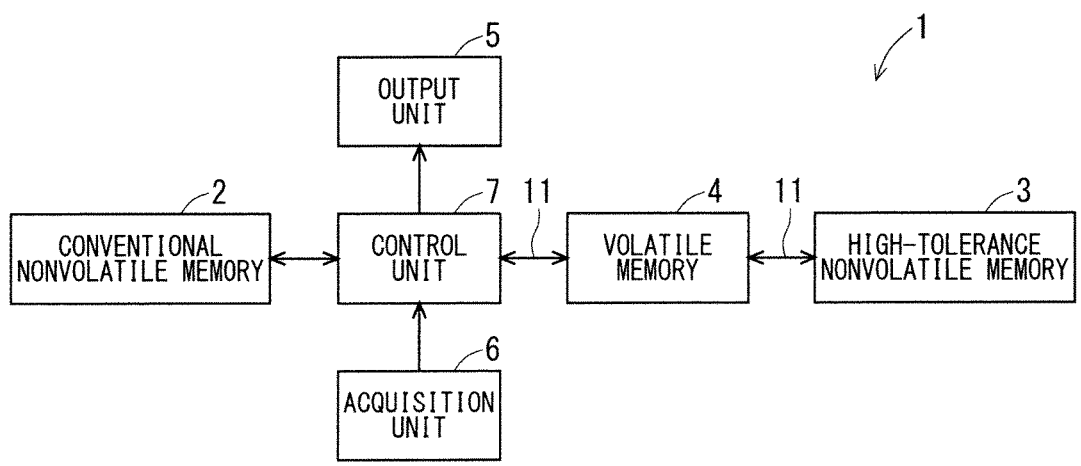
FIG. 4 is a block diagram illustrating a configuration of an infotainment device according to a third embodiment.

FIG. 4 is a block diagram illustrating a configuration of an infotainment device according to a third embodiment of the present invention. Hereinafter, of constituent elements to be described in the present third embodiment, constituent elements which are the same as or similar to the constituent elements of the second embodiment are denoted with the same reference signs, and different constituent elements will mainly be described.

A control unit 7 is connected to a high-tolerance nonvolatile memory 3 and a volatile memory 4.

The following describes an operation at the time of shutdown of the infotainment device 1 to be performed after the operation at the time of update, and an operation at the time of activation of the infotainment device 1 to be performed before the operation at the time of update. Note that it is assumed that the infotainment device 1 according to the present third embodiment performs the operation of FIG. 3 described in the second embodiment as the operation at the time of update.

<Operation at the Time of Shutdown>

Figures 6, 7, 8:
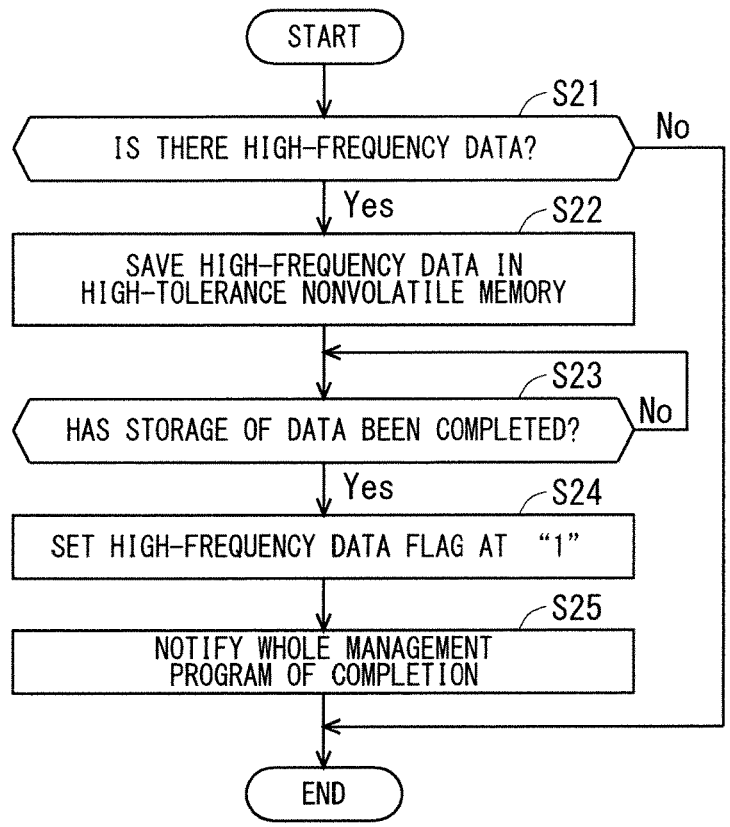
FIG. 6 is a flowchart illustrating the operation of the infotainment device according to the third embodiment.
FIG. 7 is a diagram illustrating one example of a high-frequency data flag.
FIG. 8 is a diagram illustrating one example of an activation flag with high-frequency data.

FIGS. 5 and 6 are flowcharts each illustrating the operation of the infotainment device 1 according to the present third embodiment at the time of shutdown. Specifically, FIG. 5 is a flowchart illustrating the operation of a whole management program for managing the whole at the time of shutdown, and FIG. 6 is a flowchart illustrating a shutdown preparation operation of each application program. Note that to the application program, for example, a navigation program, a music generation program, a program for generating and managing a dynamic map, and the like are applied.

When shutdown starts, the control unit 7 starts a shutdown timer in step S11 of FIG. 5. In step S12, the control unit 7 makes each application program used in the infotainment device 1 start storing high-frequency data. Accordingly, the operation of FIG. 6 starts for each application program, and the operation of FIG. 6 is continued until step S14 of FIG. 5 is executed. Here, before describing the operation after step S13 of FIG. 5, the operation of FIG. 6 will be described.

In step S21 of FIG. 6, the control unit 7 determines whether there is high-frequency data among data stored in the volatile memory 4. When it is determined that there is high-frequency data, the process proceeds to step S22, and otherwise, the operation of FIG. 6 ends.

In step S22, the control unit 7 stores (saves), in the high-tolerance nonvolatile memory 3, the high-frequency data stored in the volatile memory 4 (unsaved high-frequency data).

In step S23, the control unit 7 determines whether the storage of the data in step S22 has been completed. When it is determined that the storage has been completed, the process proceeds to step S24, and otherwise, step S23 is executed again.

In step S24, the control unit 7 sets a high-frequency data flag at "1."

Here, when the operation of FIG. 6 starts, the high-frequency data flag has been set at "0" in step S46 of FIG. 10, which will be described later. Therefore, when power supply is forcibly stopped by a user or power supply is stopped by a system fault earlier than the completion of storage in step S22, the high-frequency data flag is not set at "1" in step S24, but the operation of FIG. 6 ends while the high-frequency data flag remains "0."

FIG. 7 is a diagram illustrating one example of the high-frequency data flag. The high-frequency data flag illustrated in FIG. 7 takes a value of "0" or "1" for each application program to be saved at the time of shutdown. According to the operation described above, the high-frequency data flag being "0" indicates that the saving of the high-frequency data in the high-tolerance nonvolatile memory 3 has not been completed at the time of shutdown, and the high-frequency data flag being "1" indicates that the saving has been completed. Note that a table of FIG. 7 is stored in a conventional nonvolatile memory 2 or the high-tolerance nonvolatile memory 3.

After step S24, in step S25, the control unit 7 notifies the whole management program of the completion. Thereafter, the operation of FIG. 6 ends.

Returning to FIG. 5, after step S12, in step S13, the control unit 7 related to the whole management program waits for the completion notification (step S25) from each application program used at the time of shutdown.

In step S14, the control unit 7 determines whether the notification has been received from either application program by a timer deadline of the shutdown timer of step S11. When it is determined that the above notification has been received by the timer deadline, the process proceeds to step S15, and otherwise, the operation of FIG. 5 ends.

In step S15, the control unit 7 sets an activation flag with high-frequency data at "1." After step S15, the operation of FIG. 5 ends.

Here, when the operation of FIG. 5 starts, the activation flag with high-frequency data has been set at "0" in step S35 of FIG. 9, which will be described later. Therefore, when there is no notification described above by the timer deadline because power supply is forcibly stopped by a user or power supply is stopped by a system fault, the activation flag with high-frequency data is not set at "1" but remains "0."

FIG. 8 is a diagram illustrating one example of the activation flag with high-frequency data. The activation flag with high-frequency data illustrated in FIG. 8 takes a value of "0" or "1." According to the above operation, "0" indicates that there is no application program for which saving of the high-frequency data in the high-tolerance nonvolatile memory 3 has been completed, and "1" indicates that there are one or more application programs for which saving of the high-frequency data in the high-tolerance nonvolatile memory 3 has been completed. Note that a table of FIG. 8 is stored in the conventional nonvolatile memory 2 or the high-tolerance nonvolatile memory 3.

<Operation at the Time of Activation>

Figure 9:
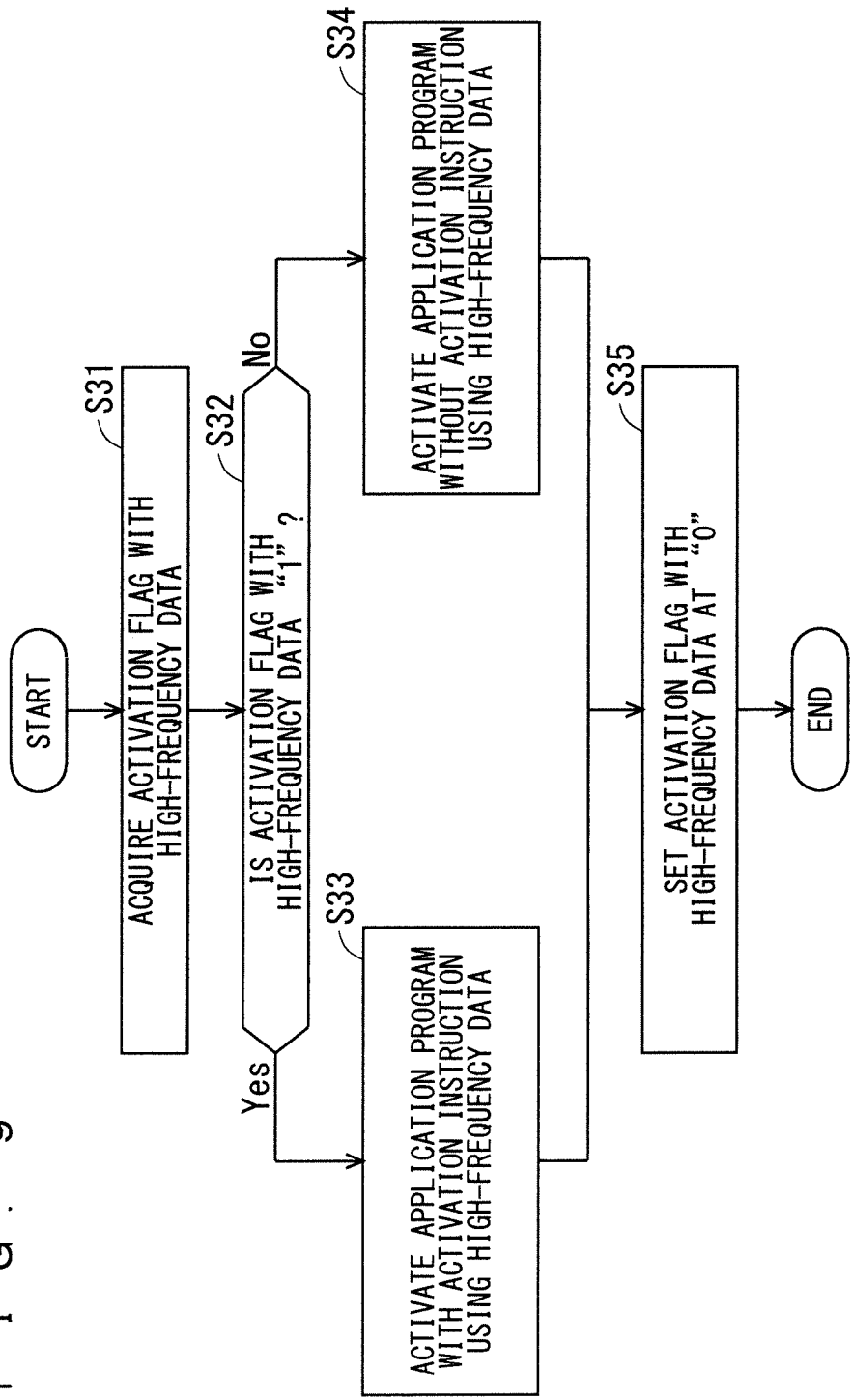
FIG. 9 is a flowchart illustrating the operation of the infotainment device according to the third embodiment.

FIGS. 9 and 10 are flowcharts each illustrating the operation of the infotainment device 1 according to the present third embodiment at the time of activation. Specifically, FIG. 9 is a flowchart illustrating the operation of the whole management program at the time of an activation process, and FIG. 10 is a flowchart illustrating the operation of each application program at the time of the activation process.

When the activation process starts, in step S31 of FIG. 9, the control unit 7 acquires and refers to the activation flag with high-frequency data from the conventional nonvolatile memory 2 or the high-tolerance nonvolatile memory 3.

In step S32, the control unit 7 determines whether the activation flag with high-frequency data is "1." When the activation flag with high-frequency data is "1", the process proceeds to step S33, and when the activation flag with high-frequency data is not "1" (is "0"), the process proceeds to step S34.

In step S33, the control unit 7 determines that activation using the high-frequency data is possible, activates the application program with an activation instruction using high-frequency data, and the operation of FIG. 10 starts. Thereafter, the process proceeds to step S35.

On the other hand, in step S34, the control unit 7 determines that activation using the high-frequency data is impossible, activates the application program without the activation instruction using high-frequency data, and the operation of FIG. 10 starts. Thereafter, the process proceeds to step S35.

In step S35, the control unit 7 sets the activation flag with high-frequency data at "0." Thereafter, the operation of FIG. 9 ends.

Next, the operation of FIG. 10 will be described. In step S41, the control unit 7 determines whether the activation instruction using high-frequency data of step S33 has been received from the whole management program. When the activation instruction using high-frequency data has been received, the process proceeds to step S42, and when the activation instruction using high-frequency data has not been received, the process proceeds to step S45.

In step S42, the control unit 7 acquires and refers to the high-frequency data flag from the conventional nonvolatile memory 2 or the high-tolerance nonvolatile memory 3.

In step S43, the control unit 7 determines whether the high-frequency data flag is "1" for each application. When the high-frequency data flag is "1", the process proceeds to step S44, and when the high-frequency data flag is not "1" (is "0"), the process proceeds to step S45.

In step S44, the control unit 7 activates the infotainment device 1 (activates the application program) by using data of the application program that is low-frequency data stored in the conventional nonvolatile memory 2, and data of the application program that is high-frequency data stored in the high-tolerance nonvolatile memory 3. At this time, the control unit 7 may generate correspondence information in which a physical address of the high-tolerance nonvolatile memory in which the high-frequency data is arranged is associated with a virtual address. Then, the control unit 7 may activate the infotainment device 1 by using the correspondence information in a process of an MMU (Memory Management Unit). Thereafter, the process proceeds to step S46.

In step S45, the control unit 7 activates the infotainment device 1 (activates the application program) by using the data of the application program stored in the conventional nonvolatile memory 2. Thereafter, the process proceeds to step S46.

In step S46, the control unit 7 sets the high-frequency data flag for the activated application program at "0." Thereafter, the operation of FIG. 10 ends.

As in the first embodiment, the infotainment device 1 according to the present third embodiment configured as described above can enhance data rewriting tolerance as the whole infotainment device 1. Furthermore, at the time of shutdown, since the infotainment device 1 according to the present third embodiment stores, in the high-tolerance nonvolatile memory 3, the high-frequency data stored in the volatile memory 4, it becomes possible to suppress data loss at the time of shutdown.

Note that in the configuration of FIG. 4, the control unit 7 has been connected to the high-tolerance nonvolatile memory 3 and the volatile memory 4 via one DRAM interface 11. However, this is not restrictive, and the control unit 7 may be connected to the high-tolerance nonvolatile memory 3 via one DRAM interface and may be connected to the volatile memory 4 via another DRAM interface.

Fourth Embodiment

FIG. 11 is a block diagram illustrating a configuration of an infotainment device according to a fourth embodiment of the present invention. Hereinafter, of constituent elements to be described in the present fourth embodiment, constituent elements which are the same as or similar to the constituent elements of the second embodiment are denoted with the same reference signs, and different constituent elements will mainly be described.

A control unit 7 is connected to a volatile memory 4 via a DRAM interface 11, and is connected to a high-tolerance nonvolatile memory 3 via a serial interface 12. Note that in the present fourth embodiment, it is assumed that the high-tolerance nonvolatile memory 3 enables reading and writing faster than a conventional nonvolatile memory 2. This DRAM interface 11 enables the control unit 7 to directly access high-frequency data stored in the high-tolerance nonvolatile memory 3 even without developing the high-frequency data in the volatile memory 4. That is, with respect to the high-frequency data stored in the high-tolerance nonvolatile memory 3, the control unit 7 can use the high-tolerance nonvolatile memory 3 and the volatile memory 4 in a similar manner. Then, it is assumed that the infotainment device 1 according to the present fourth embodiment performs the operation at the time of activation, the operation at the time of update, and the operation at the time of shutdown as in the third embodiment.

As in the first embodiment, the infotainment device 1 according to the present fourth embodiment configured as described above can implement storage that can enhance data rewriting tolerance as the whole infotainment device 1. Also, as in the third embodiment, at the time of shutdown, since the infotainment device 1 according to the present fourth embodiment stores, in the high-tolerance nonvolatile memory 3, the high-frequency data stored in the volatile memory 4, it becomes possible to suppress data loss at the time of shutdown. Furthermore, according to the present fourth embodiment, the control unit 7 is connected to the high-tolerance nonvolatile memory 3 and the volatile memory 4 via the DRAM interface 11 (second interface) that is higher in communication speed than the serial interface 12 (first interface) connected between the control unit 7 and the conventional nonvolatile memory 2. This allows suppression of load processing in reading and writing (for example, file cache replication processing, erase processing during memory writing, or the like), which makes it possible to speed up the activation. Also, it is not necessary to provide a device driver accordingly. Furthermore, it becomes possible to further reduce data loss at the time of shutdown. Also, in the configuration of FIG. 11, it has been described that the first interface connecting between the control unit 7 and the high-tolerance nonvolatile memory 3 is the DRAM interface 11, but this is an example, and the first interface may be another interface. Similarly, in the configuration of FIG. 11, it has been described that the second interface connecting between the control unit 7 and the conventional nonvolatile memory 2 is the serial interface 12, but this is an example, and the second interface may be another interface if different from the first interface.

Other Modifications

In the above description, the high-frequency data flag and the activation flag with high-frequency data are stored in the conventional nonvolatile memory 2 or the high-tolerance nonvolatile memory 3, but this is not restrictive.

Figure 12:
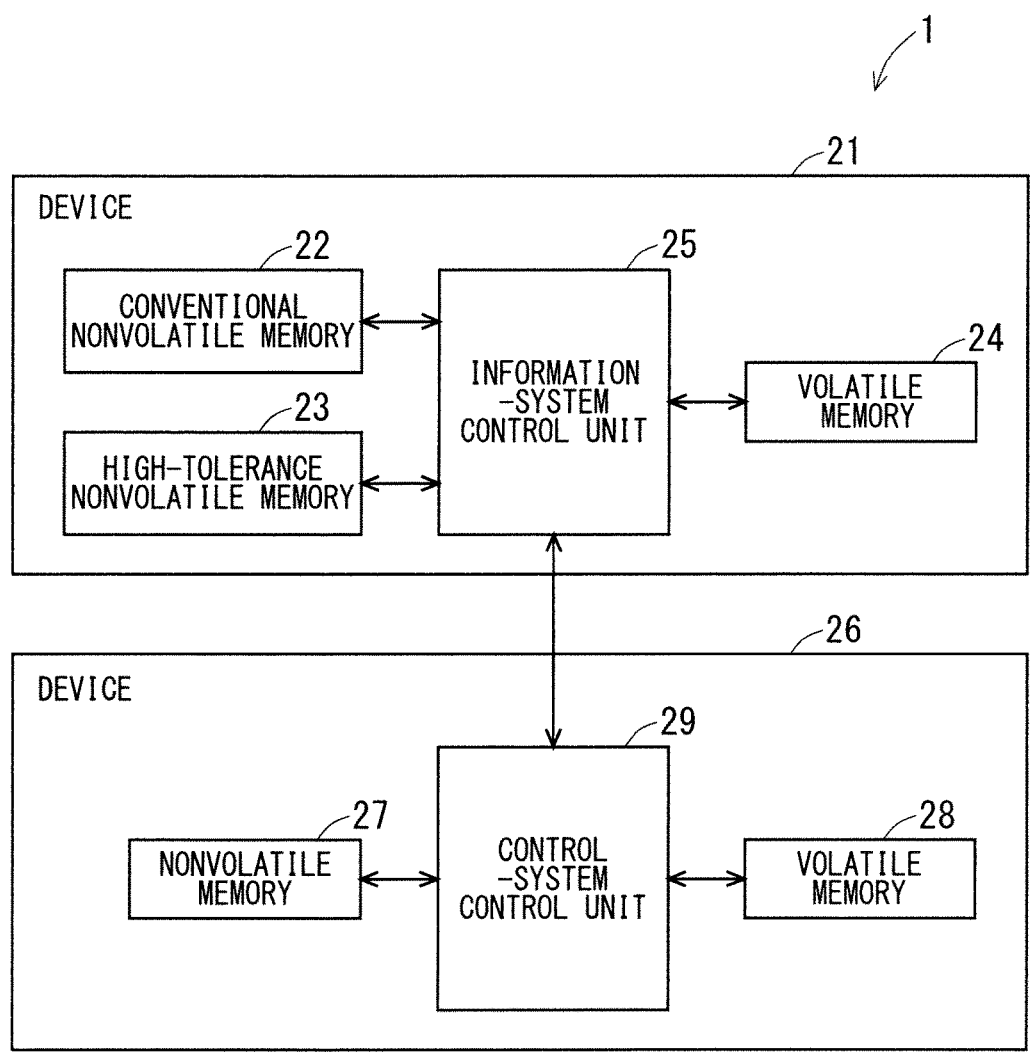
FIG. 12 is a block diagram illustrating a configuration of an infotainment device according to a modification.

For example, as illustrated in FIG. 12, the infotainment device 1 may include an information-system device 21 and a control-system device 26. Here, the information-system device 21 includes a conventional nonvolatile memory 22, a high-tolerance nonvolatile memory 23, a volatile memory 24, and an information-system control unit 25, which are substantially the same as the conventional nonvolatile memory 2, the high-tolerance nonvolatile memory 3, the volatile memory 4, and the control unit 7 of FIGS. 4 and 11, respectively. However, the information-system device 21 can perform functions other than management of the high-frequency data flag and the activation flag with high-frequency data out of functions of the infotainment device 1 of FIGS. 4 and 11.

The control-system device 26 can manage the high-frequency data flag and the activation flag with high-frequency data. The control-system device 26 includes a nonvolatile memory 27 and a volatile memory 28 that store the high-frequency data flag and the activation flag with high-frequency data, and a control-system control unit 29. At the time of activation of the infotainment device 1, a notification such as an activation instruction is made from the control-system control unit 29 to the information-system control unit 25, and at the time of shutdown of the infotainment device 1, a notification such as storage completion is made from the information-system control unit 25 to the control-system control unit 29. In this way, even with the configuration that transfers the notification to and from another device, the same effect as described above can be obtained.

Also, the infotainment device described above can be applied to an information processing system constructed as a system by appropriately combining a navigation device, a portable navigation device, a communication terminal (for example, portable terminal such as a mobile phone, smartphone, and tablet) mountable and included in a vehicle, functions of applications installed therein, and servers and the like. In this case, each function or each constituent element of the infotainment device described above may be disposed dispersedly in each device constructing the system, and may be disposed centrally in either device.

Note that in the scope of the present invention, any combination of each embodiment and each modification of the present invention can be made, and alterations and omissions of each embodiment and each modification can be made as appropriate.

Although the present invention has been described in detail, the above description is in all aspects illustrative, and the present invention is not limited thereto. It is understood that innumerable modifications not illustrated can be envisaged without departing from the scope of the present invention.

EXPLANATION OF REFERENCE SIGNS

1: infotainment device
2: conventional nonvolatile memory
3: high-tolerance nonvolatile memory
4: volatile memory
6: acquisition unit
7: control unit
11: DRAM interface
12: serial interface

The invention claimed is:

1. An information processing apparatus comprising:
a first nonvolatile memory to store first data;
a second nonvolatile memory to store second data that is higher than the first data in update frequency, the second nonvolatile memory being given the larger number of rewrites than the first nonvolatile memory;
a receiver to acquire data; and
a controller to sort the data acquired by the receiver into the first data or the second data based on an expiration date of the data.

2. The information processing apparatus according to claim 1,
wherein the controller sorts the data acquired by the receiver into the first data or the second data based on a type of the data.

3. The information processing apparatus according to claim 1,
wherein the controller sorts the data acquired by the receiver into the first data or the second data based on an update history of the data.

4. The information processing apparatus according to claim 3 wherein the controller predicts an update frequency or an update cycle of the data based on the update history of the data at a plurality of points of time acquired by the receiver, and sorts the data into the first data or the second data based on the update frequency or the update cycle.

5. The information processing apparatus according to claim 1,
wherein the controller sorts the data acquired by the receiver into the first data or the second data based on information on a vehicle in which the information processing apparatus is mounted.

6. The information processing apparatus according to claim 5, wherein the Controller predicts an update frequency or an update cycle of the data based on the information on the vehicle, and sorts the data into the first data or the second data based on the update frequency or the update cycle.

7. The information processing apparatus according to claim 1, further comprising
a volatile memory,
wherein the information processing apparatus stores, in the second nonvolatile memory, the second data stored in the volatile memory when stopping power supply of the information processing apparatus.

8. The information processing apparatus according to claim 7, wherein the information processing apparatus uses the second data stored in the second nonvolatile memory when the information processing apparatus is activated with the second data stored in the second nonvolatile memory.

9. The information processing apparatus according to claim 1, further comprising
a volatile memory,
wherein the controller is connected to the first nonvolatile memory via a first interface, and is connected to the second nonvolatile memory and the volatile memory via a second interface different from the first interface.

10. The information processing apparatus according to claim 1, wherein the second data includes data of a dynamic map that is a dynamically changeable map.

11. An information processing method comprising:
storing first data in a first nonvolatile memory;
storing second data that is higher than the first data in update frequency in a second nonvolatile memory being given the larger number of rewrites than the first nonvolatile memory;
acquiring data; and sorting the acquired data into the first data or the second data based on an expiration date of the data.

* * * * *